US007167675B2

(12) United States Patent
Lynch et al.

(10) Patent No.: US 7,167,675 B2
(45) Date of Patent: Jan. 23, 2007

(54) MAGNETIC SWITCH AND APPARATUS INCLUDING MAGNETIC SWITCH

(75) Inventors: Larry Lynch, Los Gatos, CA (US); Richard Freeman, San Carlos, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 10/966,055

(22) Filed: Oct. 15, 2004

(65) Prior Publication Data

US 2006/0082429 A1 Apr. 20, 2006

(51) Int. Cl.
*G09B 5/00* (2006.01)
*H01H 9/00* (2006.01)

(52) U.S. Cl. ...................................... 434/317; 335/205

(58) Field of Classification Search ........ 335/205–207; 200/404; 434/317

See application file for complete search history.

(56) References Cited

U.S. PATENT DOCUMENTS 3,055,999 A * 9/1962 Lucas ......................... 200/404
3,273,091 A * 9/1966 Wales, Jr. ................... 335/207
4,150,350 A * 4/1979 Fong .......................... 335/205
4,464,118 A 8/1984 Scott et al.
4,686,332 A 8/1987 Greanias et al.
4,913,463 A 4/1990 Tlapek et al.
4,997,374 A 3/1991 Simone
5,007,085 A 4/1991 Greanias et al.
5,113,178 A 5/1992 Yasuda et al.
5,117,071 A 5/1992 Greanias et al.
5,149,919 A 9/1992 Greanias et al.
5,157,384 A 10/1992 Greanias et al.
5,217,378 A 6/1993 Donovan
5,417,575 A 5/1995 McTaggart
5,485,176 A 1/1996 Ohara et al.
5,575,659 A 11/1996 King et al.
5,604,517 A 2/1997 Filo
5,681,170 A 10/1997 Rieber et al.
5,686,705 A 11/1997 Conroy et al.
5,829,985 A 11/1998 Campanella
5,877,458 A 3/1999 Flowers
5,897,324 A 4/1999 Tan (Continued)

OTHER PUBLICATIONS

U.S. Appl. No. 60/200,725; filed on Apr. 27, 2000; 28 pages.

(Continued)

*Primary Examiner*—Ramon M. Barrera
(74) *Attorney, Agent, or Firm*—Townsend and Townsend and Crew LLP

(57) ABSTRACT

A magnetic switch and children's apparatuses, such as print media apparatuses and plush dolls, which include magnetic switches are disclosed. One magnetic switch includes a first conductor and a second conductor spaced apart from the first conductor. A third conductor is disposed under the first and second conductors, the third conductor being formed from a magnetic material. A magnet is also included, the magnet being adapted to move the third conductor towards the first and second conductors so as to form a conductive bridge. Another magnetic switch includes a first conductor and a second conductor spaced apart from the first conductor. A first magnet is disposed under the first and second conductors. A second magnet is also included, the second magnet being adapted to move the first magnet so that the first and second conductors form a conductive bridge.

27 Claims, 16 Drawing Sheets

U.S. PATENT DOCUMENTS

| | | | | |
|---|---|---|---|---|
| 5,954,514 | A * | 9/1999 | Haas et al. | 434/317 |
| 6,572,378 | B1 | 6/2003 | Rehkemper et al. | |
| 6,608,618 | B1 | 8/2003 | Wood et al. | |
| 6,661,405 | B1 | 12/2003 | Flowers | |
| 6,668,156 | B1 | 12/2003 | Lynch et al. | |
| 6,763,995 | B1 | 7/2004 | Song | |
| 2001/0051329 | A1 | 12/2001 | Lynch et al. | |
| 2002/0197587 | A1 | 12/2002 | Wood et al. | |
| 2002/0197588 | A1 | 12/2002 | Wood et al. | |
| 2003/0162162 | A1 | 8/2003 | Marggraff | |
| 2003/0175672 | A1 | 9/2003 | Kim et al. | |
| 2005/0026128 | A1 * | 2/2005 | Wood et al. | 434/317 |
| 2005/0200116 | A1 * | 9/2005 | Chiu | 281/15.1 |

OTHER PUBLICATIONS

Web page; "Flip Flap Faces Book"; at URL=http://thinkingfun.com/a02a.htm; printed Feb. 23, 2005; 2 pages.

Web page; "Fun Flip Book"; at URL=http://familycrafts.about.com/library/projects/blflipface.htm; printed Aug. 18, 2004; 2 pages.

Web page; "Making Faces"; at URL=http://www.amazon.com/exec/obidos/tg/detail/-/156458111X/ref=ed_oe_h/102-1879669-8 . . .; printed Aug. 18, 2004; 5 pages.

Web page; "Middle School Substitute Lessons"; at URL=http://www.princetonol.com/groups/iad/lessons/SubPlans/submiddle.htm; printed Feb. 23, 2005; 7 pages.

Web page; at URL=http://www.pilbooks.com/childrens/index.cfm/classname/Story%20Reader; printed Feb. 23, 2005; 3 pages.

Web page; at URL=http://www.pilbooks.com/storyreaders/; printed Feb. 23, 2005; 1 page.

* cited by examiner

MAGNETIC SWITCH AND APPARATUS INCLUDING MAGNETIC SWITCH

BACKGROUND OF THE INVENTION

The present invention relates generally to magnetic switches. More particularly, the present invention relates to children's apparatuses, such as books and toys, which include magnetic switches.

A number of book reading apparatuses are known. A recent print media apparatus is described in U.S. patent application Ser. No. 10/781,554, assigned to the assignee of the present application and incorporated herein by reference in its entirety for all purposes. Such an apparatus may comprise a book placed on a product base. A plurality of electrical elements, such as pressure-sensitive switches that are activated by pressure, may be located in the product base. When a child depresses a print element in the book, the child also depresses a pressure switch underneath the book. A speaker in the base unit then sounds out various audio output.

Another type of electrical element may be a piezoelectric type element. The application of pressure to a piezoelectric type element causes it to change resistance. Pressure can be applied, for example, by a finger or a marking instrument such as a crayon that is above the electrical element. Examples of pressure switches of the Mylar™ type are disclosed in U.S. Pat. No. 6,608,618, which is assigned to the assignee of the present application and incorporated herein by reference in its entirety for all purposes.

Further electrical elements may comprise antennas such as those described in U.S. Pat. Nos. 5,877,458; 5,686,705; 6,661,405; 6,668,156 and U.S. patent application Ser. Nos. 60/200,725 and 10/360,564. All of these patents and patent applications are assigned to the assignee of the present application and are incorporated herein by reference in their entirety for all purposes. The antennas can transmit signals that can be received by a stylus that is coupled to the product base. The stylus acts as a receiving antenna. When the stylus is positioned over a major surface, the stylus receives a signal that is particular for the electrical element underneath the stylus. Then, the position of the stylus relative to the major surface can be determined. The stylus could be used to interact with print elements on a sheet that is secured to the product base. The electrical elements may be transmitting antennas that regularly transmit signals that are received by the stylus, or may be receiving antennas that receive a signal from the stylus.

Automatic page detection systems are also known. For example, the pages may have reflectors or holes. Specific combinations of pages may form different patterns using the reflectors or holes, and the patterns may be used to activate an array of sensors in the product base to determine which page or pages are being displayed to the user. In another page detection system, each page may have a magnet embedded at a different location along the length of the spine of a book. An array of reed switches can be in the product base in the vicinity of the spine region of the book when the book is on the base unit. When a page is turned, a specific combination of switches is activated, thus informing the electronics in the product base as to which page or pages are currently being displayed to the user. A product that uses this type of reed switch is called StoryReader™ from Publications International, Ltd.

Alternative switches for use in children's apparatuses would further be advantageous.

BRIEF SUMMARY OF THE INVENTION

Embodiments of the invention are directed to magnetic switches and children's apparatuses, such as print media apparatuses and plush dolls, which include magnetic switches.

One embodiment of the invention is directed to a magnetic switch comprising: (a) a first conductor; (b) a second conductor; (c) a third conductor disposed under the first and second conductors, the third conductor being formed from a magnetic material; and (d) a magnet adapted to move the third conductor towards the first and second conductors so as to form a conductive bridge.

Another embodiment of the invention is directed to a print media apparatus comprising: (a) a platform including a surface; (b) at least one magnetic switch under the surface, the magnetic switch including first and second spaced apart conductors and a third conductor disposed under the first and second conductors, the third conductor being from a magnetic material; (c) a processor coupled to the magnetic switch; and (d) a book on the surface, wherein a magnet is coupled to a page of the book and adapted to move the third conductor towards the first and second conductors so as to form a conductive bridge.

Another embodiment of the invention is directed to a plush doll comprising: (a) a plush body including a surface; (b) at least one magnetic switch under the surface, the magnetic switch including first and second spaced apart conductors and a third conductor disposed under the first and second conductors, the third conductor being from a magnetic material; (c) a processor coupled to the magnetic switch; and (d) a book on the surface, wherein a magnet is coupled to a page of the book and adapted to move the third conductor towards the first and second conductors so as to form a conductive bridge.

Another embodiment of the invention is directed to a plush doll comprising: (a) a plush body including a surface; (b) at least one switch under the surface; (c) a processor coupled to the switch; (d) a flip book on the surface; (e) a speaker coupled to the processor.

Another embodiment of the invention is directed to an interactive print media apparatus comprising: (a) a platform including a surface; (b) at least one magnetic switch under the surface; (c) a print medium on the platform; (d) a processor coupled to the magnetic switch; (e) a stylus coupled to the platform, the stylus including a magnet adapted to close the magnetic switch.

Another embodiment of the invention is directed to a magnetic switch comprising:(a) a first conductor; (b) a second conductor spaced apart from the first conductor; (c) a first magnet disposed under the first and second conductors; and (d) a second magnet adapted to move the first magnet so that the first and second conductors form a conductive bridge.

Another embodiment of the invention is directed to a print media apparatus comprising: (a) a platform including a surface; (b) at least one magnetic switch under the surface, the magnetic switch including first and second spaced apart conductors and a first magnet disposed under the first and second conductors; (c) a processor coupled to the magnetic switch; and (d) a book on the surface, wherein a second magnet is coupled to a page of the book and adapted to move the first magnet so that the first and second conductors form a conductive bridge.

Another embodiment of the invention is directed to a plush doll comprising: (a) a plush body including a surface; (b) at least one magnetic switch under the surface, the magnetic switch including first and second spaced apart conductors and a first magnet disposed under the first and second conductors; (c) a processor coupled to the magnetic switch; and (d) a book on the surface, wherein a second magnet is coupled to a page of the book and adapted to move the first magnet so that the first and second conductors form a conductive bridge.

Another embodiment of the invention is directed to an interactive print media apparatus comprising: (a) a platform including a surface; (b) at least one magnetic switch under the surface, the magnetic switch including first and second spaced apart conductors and a first magnet disposed under the first and second conductors; (c) a print medium on the platform; (d) a processor coupled to the magnetic switch; (e) a stylus coupled to the platform, the stylus including a second magnet adapted to close the magnetic switch.

These and other embodiments are described in further detail below with reference to the drawings and the detailed description.

The following drawings should be read with reference to the detailed description. Like numbers in different drawings refer to like elements. The drawings, which are not necessarily to scale, illustratively depict embodiments of the present invention and are not intended to limit the scope of the invention.

DETAILED DESCRIPTION OF THE INVENTION

Embodiments of the invention are directed to magnetic switches and children's apparatuses, such as print media apparatuses and plush dolls, which include magnetic switches.

Figure 1A:
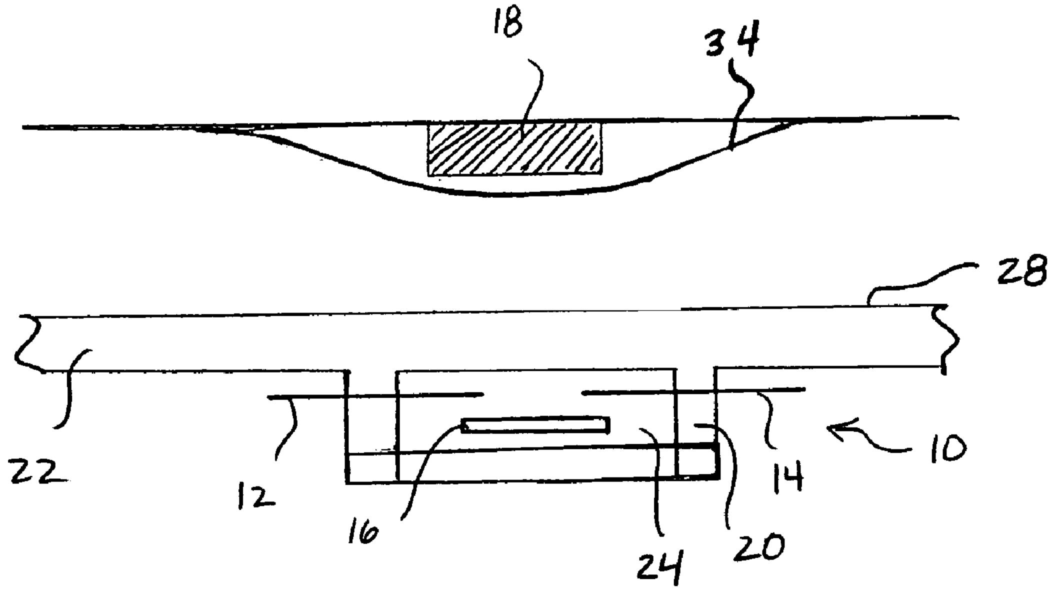
FIGS. 1A and 1B show cross-sectional side views of a magnetic switch in an open and closed configuration respectively according to an embodiment of the present invention.
Figure 1B:
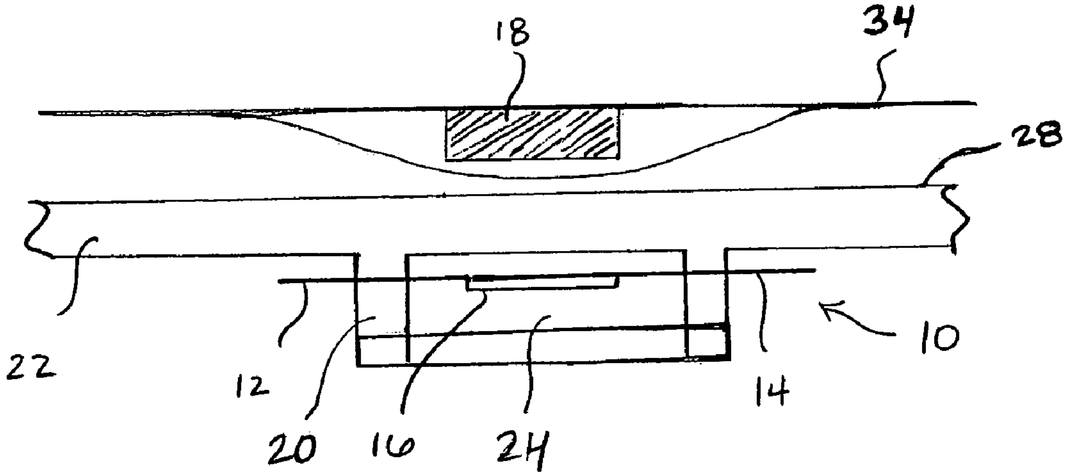

FIG. 1A shows a cross-sectional side view of a magnetic switch 10 in an open configuration and FIG. 1B shows a cross-sectional side view of the magnetic switch 10 in a closed configuration according to an embodiment of the invention. The magnetic switch 10 generally comprises a first conductor 12, a second conductor 14 spaced apart from the first conductor 12, and a third conductor 16 disposed under the first 12 and second 14 conductors. The third conductor 16 may be formed from a variety of magnetic materials, including iron (ferrous materials), nickel, cobalt, alloys thereof, and like metals. A magnet 18 is further included, wherein the magnet 18 is adapted to move the third conductor 16 towards the first 12 and second 14 conductors so as to form a conductive bridge which closes the switch 10, as shown in FIG. 1B. The magnetic switches 10 of the present invention are advantageously cost effective and reliable, and hence lend themselves for inclusion into children's apparatuses. For example, a typical reed switch may cost about 12¢ to 15¢ to purchase, whereas a switch according to an embodiment of the invention can be as inexpensive as 2¢ to produce. This can result in a significant cost savings if thousands of products are produced. It will be appreciated that the above depictions are for illustrative purposes only and do not necessarily reflect the actual shape, size, or dimensions of the magnetic switch 10. This applies to all depictions hereinafter.

The first 12 and second 14 conductors may be formed from a variety of materials. Preferably, the first 12 and second 14 conductors are formed from non-magnetic conductive, materials, including copper, bronze, silver, gold, alloys thereof, and like materials. Alternatively, the first 12 and second 14 conductors may be formed from magnetic materials such as those described above with respect to the third conductor 16. The first 12 and second 14 conductors may be inserted or attached to a housing support 20 of a product platform 22 or base unit. The third conductor 16 is free-floating (i.e., non-stationary, unaffixed) in a cavity 24 of the platform 22. As such, when the third conductor 16 is aligned with the magnet 18 along an axis and in relatively close proximity of its magnetic field, the third conductor 16 is attracted to and fixes itself in the direction of the magnetic median so as form a conductive bridge with the first 12 and second 14 conductors.

Figure 2:
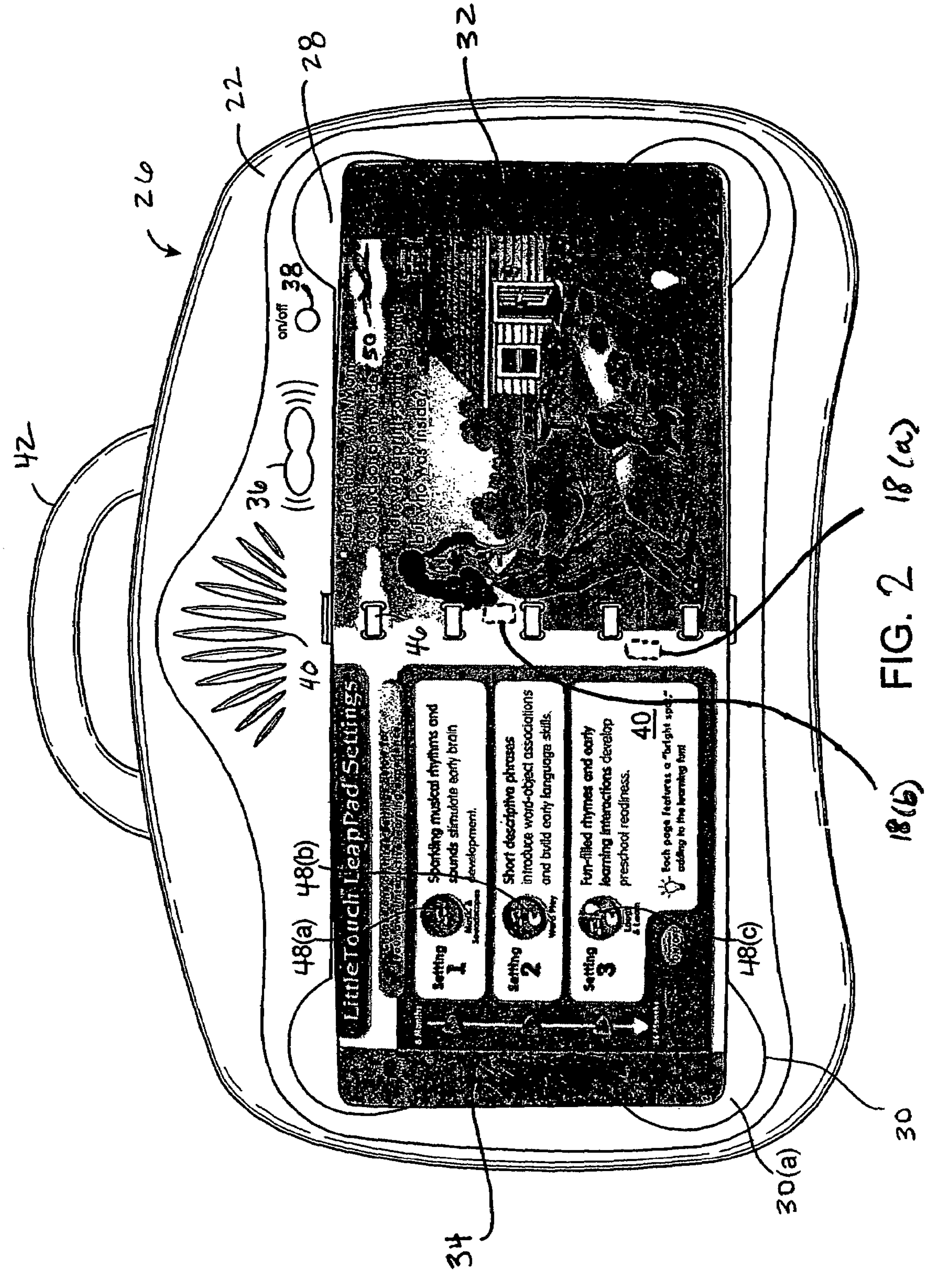
FIG. 2 shows a plan view of the print media apparatus including the magnetic switch according to another embodiment of the present invention.

FIG. 2 shows a print media apparatus 26 incorporating a magnetic page detection switch that automatically detects turning of book pages according to another embodiment of the invention. The print media apparatus 26, which is described in more detail in co-pending U.S. patent application Ser. No. 10/781,554, includes a platform 22 that includes a surface 28, and a border region 30 defining the surface 28. A book 32 is on the surface 28 and is at a first side of the platform 22. The second side of the platform 22 may be opposite to the first side of the platform 22. The border region 30 includes a number of finger wells 30(*a*) which allow a parent or child to grasp pages 34 of the book 32 to turn them. The platform 22 also includes a volume control button 36, an on/off switch 38, and a speaker 40. A handle 42 is also attached to the platform 22 to allow a user to carry the apparatus 26. In some embodiments, an automatic shut-off feature may be pre-programmed into a processor 44 in the apparatus 26.

A magnetic switch 10, such as that illustrated in FIGS. 1A and 1B, is under the surface 28 of the platform 22. The magnetic switch 10 generally comprises a first conductor 12, a second conductor 14 spaced apart from the first conductor 12, and a magnetic third conductor 16 disposed under the first 12 and second 14 conductors. A processor 44 (FIG. 3) is coupled to the magnetic switch 10 and to the speaker 40. A magnet 18 is coupled to a page 34 of the book 32 and adapted to move the third conductor 16 towards the first 12 and second 14 conductors so as to form a conductive bridge which closes the switch 10, as shown in FIG. 1B. The magnet 18 in this embodiment may additionally be laminated or otherwise affixed, such as with adhesives, to the page 34. Preferably, the magnet 18 is embedded within the page 34 so it is hidden from the user.

The print media apparatus 26 typically includes a plurality of magnetic switches 10 offset at different locations in the platform 22 under the surface 28. Likewise, the print media apparatus 26 typically includes a plurality of magnets 18 offset at different locations within a plurality of pages 34 so as to activate a different switch for each set of displayed pages. The magnets 18 and switches 10 are preferably located at the edges of the pages of the book or along the spine of the book. This is done so that the page detection mechanism does not interface with the child's ability to interact with the content on the pages of the book.

Operation of the magnetic page detection switch 10 simply involves turning book pages 34 (i.e., pages themselves activate switches). Specifically, when a page 34 is turned, a specific switch or specific combination of switches 10 is activated (e.g., closed and/or opened), thus informing the processor 44 in the product base 22 as to which page or pages 34 are currently being displayed to the user. The microprocessor 44 in turn retrieves code for that specific page or pages 34 that are being displayed from a memory device and provides audio output through the speaker 40. For example, as shown in FIG. 2, magnet 18(a) is embedded in the left page of the book, and it interacts with a switch (not shown) directly under it in the platform 22. The electronics in the platform 22 are informed that the pages shown in FIG. 2 are currently displayed. When the user turns the right page, this relocates the magnet 18(*b*) in the right page so that it is directly over the magnet 18(*a*). Magnet 18(*b*) then activates a switch under it and informs the electronics in the platform that a new set of pages is being displayed to the user. Exemplary audio output include letters, stories, numbers, words, phrases, jokes, music, rhymes, songs, rhythms, questions, answers, prompts, sound effects, fact, etc. Audio output can supplement and reinforce visual output such as letters, pictures, and numbers that may be on the pages 34. The combination of both audio output and visual output reinforces concepts that are taught by the apparatus 26.

Although older children can use this embodiment of the invention, it is especially suitable for use by younger children. For example, 12 to 24 months of age is a period when word comprehension, word production, and grammar skills increase dramatically. In this period, children learn abstract ideas like shapes, numbers, and colors. This embodiment is well suited to teach such skills and concepts. Additionally, automatic page detection is well suited for pre-school age children.

Although a book 32 is shown, other print media such as activity cards, or sheets can be used. The activity cards and sheets can have various print elements like the books that are explicitly described herein. The pages 34 of the book 32 may be made of any suitable material. Preferably, the pages 34 of the book 32 comprise sheets of continuous high-density polyethylene fibers that are randomly distributed and non-directional. An exemplary material that has such characteristics is Tyvek™, which is commercially available from DuPont. Materials such as this are thin, flexible, and tear resistant. They are also thin and slippery and consequently allow more pages to be used.

The pages of the book 32 are bound with a ring type spine 46 that passes through the pages of the book 32. The opposite, longitudinal ends of the ring-type spine 18 include second coupling elements (not shown). The second coupling elements can engage first coupling elements (not shown) at coupling points at opposite edge regions of the surface 28. The second coupling elements may be male-type coupling elements, while the first coupling elements may be female-type coupling elements (or vice-versa). In either case, the first and second coupling elements may engage each other and may removably couple the book 32 to the platform 22. When the book 32 is coupled to the platform 22, it does not fall out when the platform 22 is turned upside down.

Mode selection print elements can also be present in the book 32. The left page in FIG. 2 shows three icons for three different modes including a first mode, a second mode, and a third mode. As shown on the left page, the three different modes can correspond to three different learning levels for three different ages of a child. In this example, the first mode provides sparkling musical rhythms and sounds when the user presses a first icon 48(*a*), and then the print element 50. For example, when print element 50 in the form of an airplane is pressed, a pressure switch (not shown) under the airplane activates, and the microprocessor 44 in the platform 22 retrieves code for an airplane sound from the memory device and plays the airplane sound through the speaker 40. The second mode provides a short descriptive phrase when the user presses the second icon 48(*b*) and then the print element 50. For example, in the second mode, after the user presses the print element 50, the phrase "zooming airplane" may sound from the speaker 40. The third mode provides a fun-filled rhyme and early learning interaction when the user presses the third icon 48(*c*) and then the same print element 50. For example, in the third mode, after the user presses the print element 50, the phrase "Flying, flying, through the air, I can fly most anywhere" can sound through the speaker 40. Thus, a single print element 50 may be depressed by the user to provide three different outputs associated with three different modes via the pressure switch. As illustrated by the above example, the three different outputs are suitable for different ages to encourage learning as young children such as infants and toddlers rapidly progress in their intellectual ability, especially during the ages of 6 months to 36 months.

Figure 3:
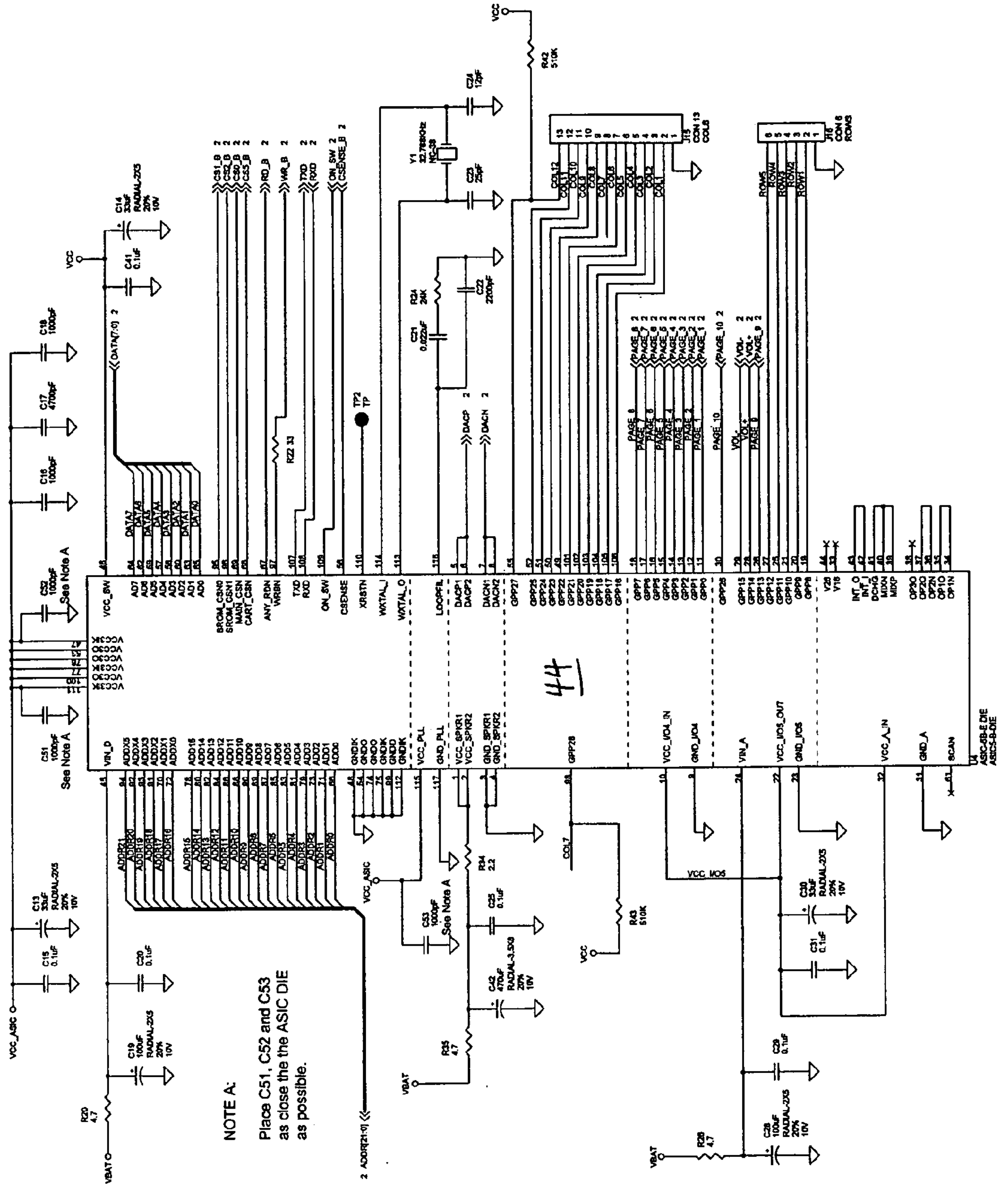
FIGS. 3 through 5 show exemplary electrical schematic drawings for electronics that can be used in the embodiment of FIG. 2.
Figure 4:
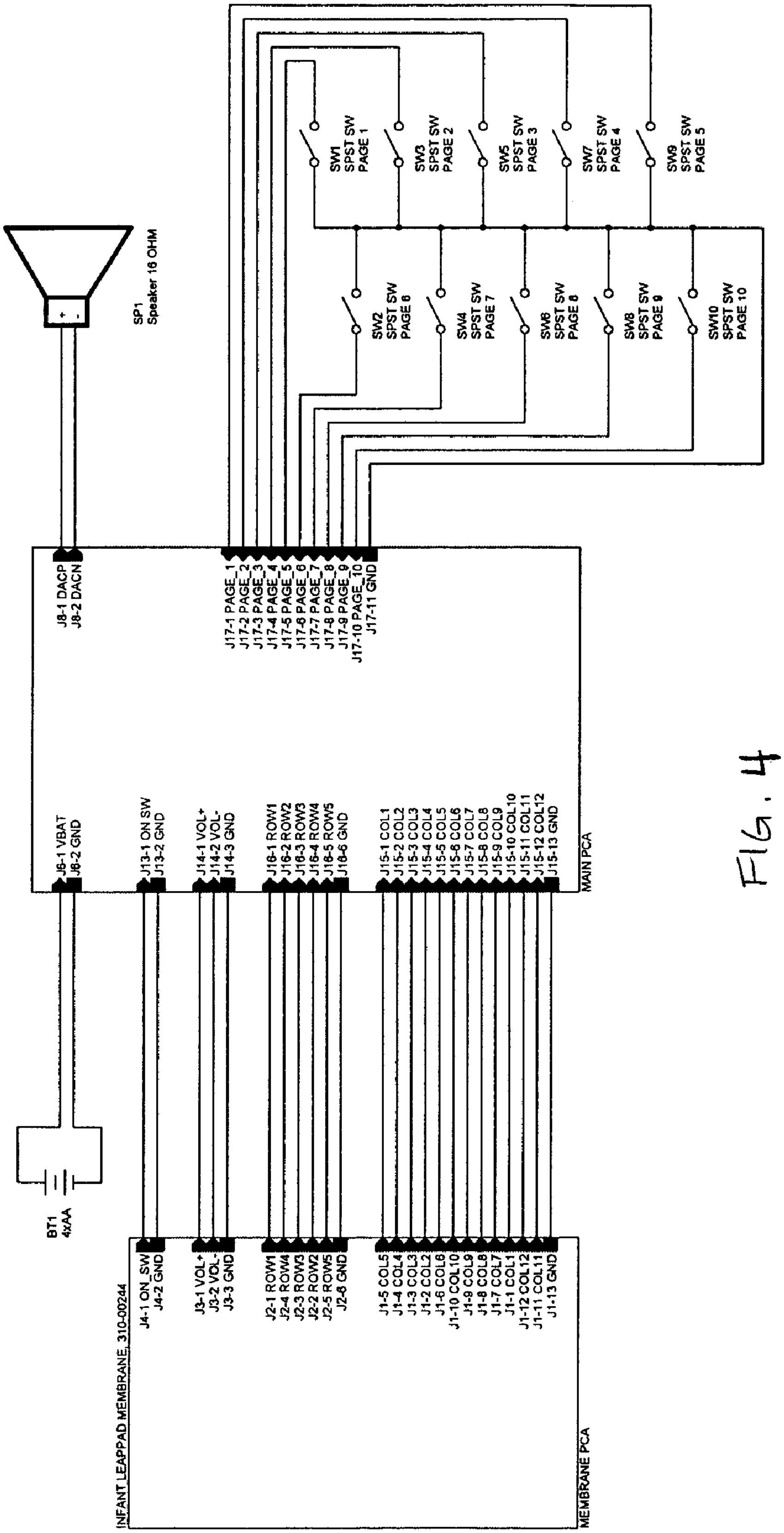
Figure 5:
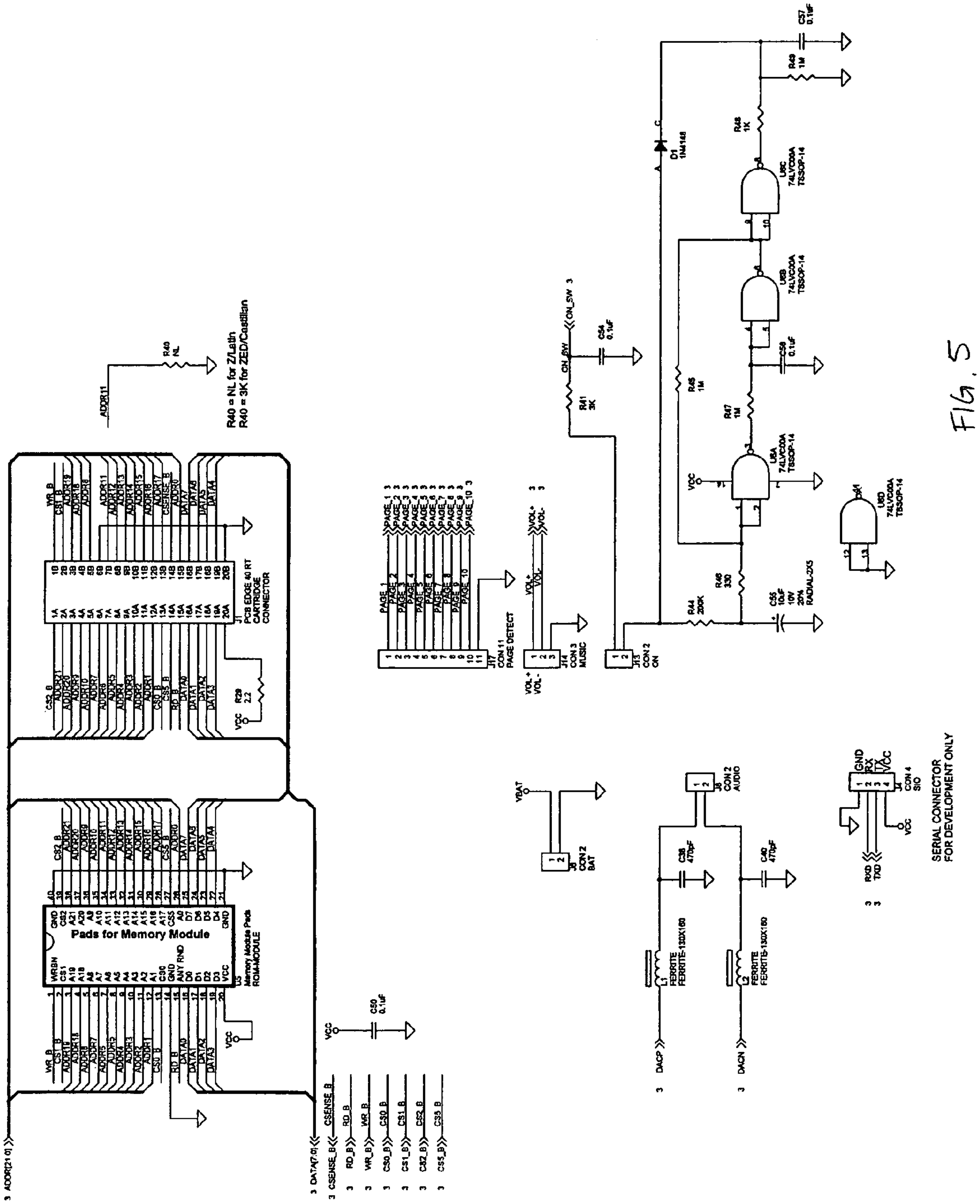
Figure 6A:
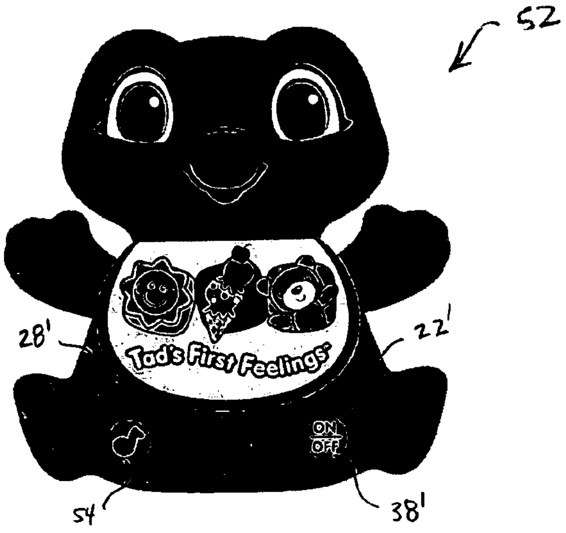
FIG. 6A through 6G show plan views of the plush doll including the magnetic switch according to another embodiment of the present invention.
Figure 6B:
Figure 6C:
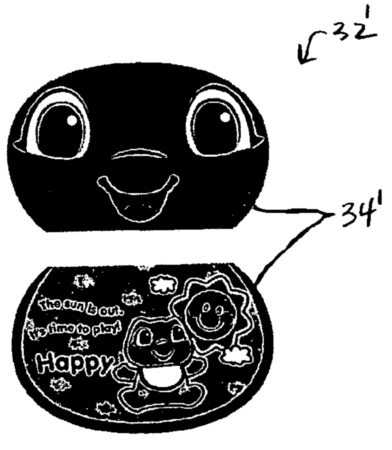
Figure 6D:
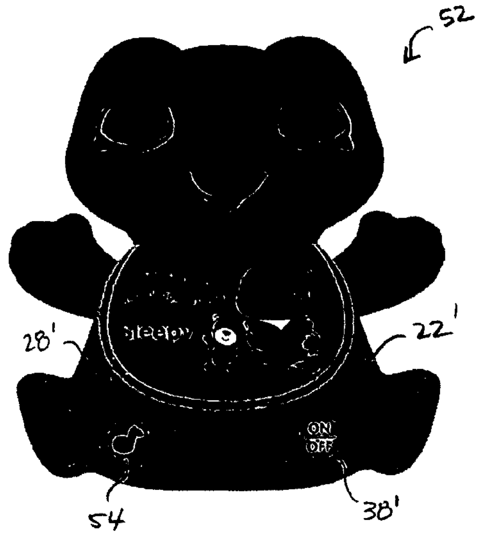
Figure 6E:
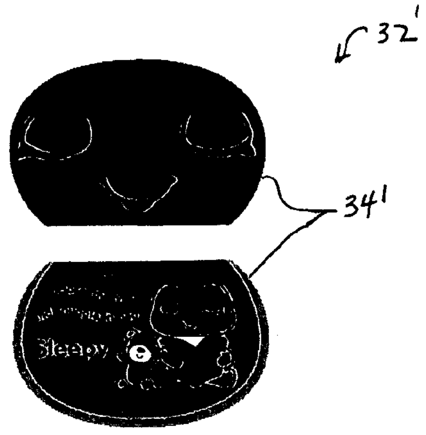
Figure 6F:
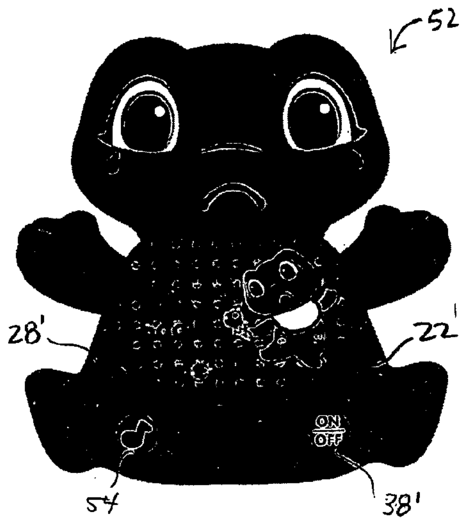
Figure 6G:
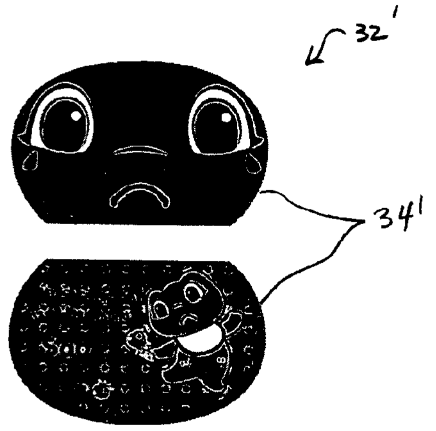

FIG. 3–5 show exemplary circuit diagrams of a circuit implementation that can be used in this embodiment. It is understood that many other circuit implementations can be used and yet still arrive at this embodiment.

FIG. 3 shows the microprocessor 44 which is electrically coupled to the magnetic switch array, as shown in FIG. 4. The microprocessor 44 may include or be coupled to a memory device that contains code for audio outputs, code or visual outputs, code for an operating system, etc. Many commercially available microprocessors including those commercially available from SunPlus Technologies may be used. The switch arrays could be under the surface of the platform upon which the book rests. FIG. 4 shows the electrical connections between a membrane PCA (printed circuit assembly) with the switch array and a main PCA. The main PCA is coupled to a speaker and a battery. The speaker is electrically coupled to the microprocessor 44 shown in FIG. 3. FIG. 5 shows pads for a memory module and a PCB (printed circuit board) edge connector.

FIGS. 6A through 6G show a plush doll 52 incorporating a switch according to another embodiment of the invention. The plush doll includes a plush body 22' having a surface 28', a switch under the surface 28', a processor 44' coupled to the switch and to a speaker (FIG. 7), and a flip book 32' on the surface 28' and at a first side of the plush body 22'. As further illustrated in FIGS. 6C, 6E, and 6G, the flip book 32' has a plurality of pages 34'. The plush body 22' also includes an on/off switch 38' and a pressure-sensitive song mode switch 54. The plush body 22' of the doll may comprise a human or animal shape. In this case, the plush doll 22' resembles a frog like animal. The plush body 22' may comprise a rigid or semi rigid structure housing the electronics (e.g., switch, processor, speaker, etc.) that is padded with a variety of batting materials, such as polyester fiber, so as to form a stuffed figurine. In some embodiments, an automatic shut-off feature may be pre-programmed into the processor 44' of the plush doll 52.

Although older children can use this embodiment of the invention, it is especially suitable for use by younger children, preferably from 6 to 24 months of age. A children's flip book 32' is shown that teaches about emotions or feelings, such as being happy, sad, or sleepy. It will be appreciated that other print media may be used such as activity cards or sheets. The book pages 34' may comprise soft fabric material that are additionally padded with a thin layer of batting materials, such as polyester fiber. Such a soft fabric book 32' is especially suitable for use by younger children.

In a preferred embodiment, magnetic page detection switches 10 that automatically detect turning of book pages, are utilized such as those illustrated in FIGS. 1A and 1B. The switch 10 is under the surface 28' of the plush body 22'. The magnetic switch 10 generally comprises a first conductor 12, a second conductor 14 spaced apart from the first conductor 12, and a magnetic third conductor 16 disposed under the first 12 and second 14 conductors. A magnet 18 is coupled to a page 34' of the book 32' and adapted to move the third conductor 16 towards the first 12 and second 14 conductors so as to form a conductive bridge which closes the switch 10, as shown in FIG. 1B. The magnet 18 in this embodiment may additionally be laminated or otherwise affixed, such as with adhesives, to the page 34'. Preferably, the magnet 18 is embedded within the page 34' so it is hidden from the user.

The plush doll 52 typically includes a plurality of magnetic switches 10 offset at different locations in the body 22' under the surface 28'. Likewise, the plush doll 52 typically includes a plurality of magnets 18 offset at different locations within a plurality of pages 34' so as to activate a different switch for each set of displayed pages. Operation of the magnetic page detection switch 10 simply involves turning book pages 34' (i.e., pages themselves activate switches). Specifically, when a page 34' is turned, a specific switch or specific combination of switches 10 is activated (e.g., closed and/or opened), thus informing the processor 44' as to which page or pages 34' are currently being displayed to the user. The microprocessor 44' in turn retrieves code for that specific page or pages 34' that are being displayed from a memory device and provides audio output through the speaker. Exemplary audio output include letters, stories, numbers, words, phrases, jokes, music, rhymes, songs, rhythms, questions, answers, prompts, sound effects, fact, etc. For example, the audio output may preferably comprise a story about the emotion that is featured on the displayed page 34'. Audio output can supplement and reinforce such visual output. The combination of both audio output and visual output reinforces concepts that are taught by the plush doll 52.

Alternatively, the switch may comprise a plurality of electrical elements. For example, the electrical elements may comprise a plurality of pressure-sensitive switches. A pressure switch may comprise, for example, facing conductive regions that are separated by an air gap. Pressure applied to the conductive regions causes the facing conductive regions to contact each other closing the switch. In another example, the electrical elements may comprise a plurality of transmitting or receiving antennas that interact with a stylus. In another example, the switch may comprise a plurality of reed switches. A reed switch generally comprises two overlapping magnetic conductors within a glass enclosure that are offset by an air gap and closed by a magnet.

Additionally, when the music note 54 is pressed, a pressure switch under the music note 54 activates, and the microprocessor 44' in the plush body 22' retrieves code for a song that teaches about emotions and social interactions from the memory device and plays the song through the speaker.

Figure 7:
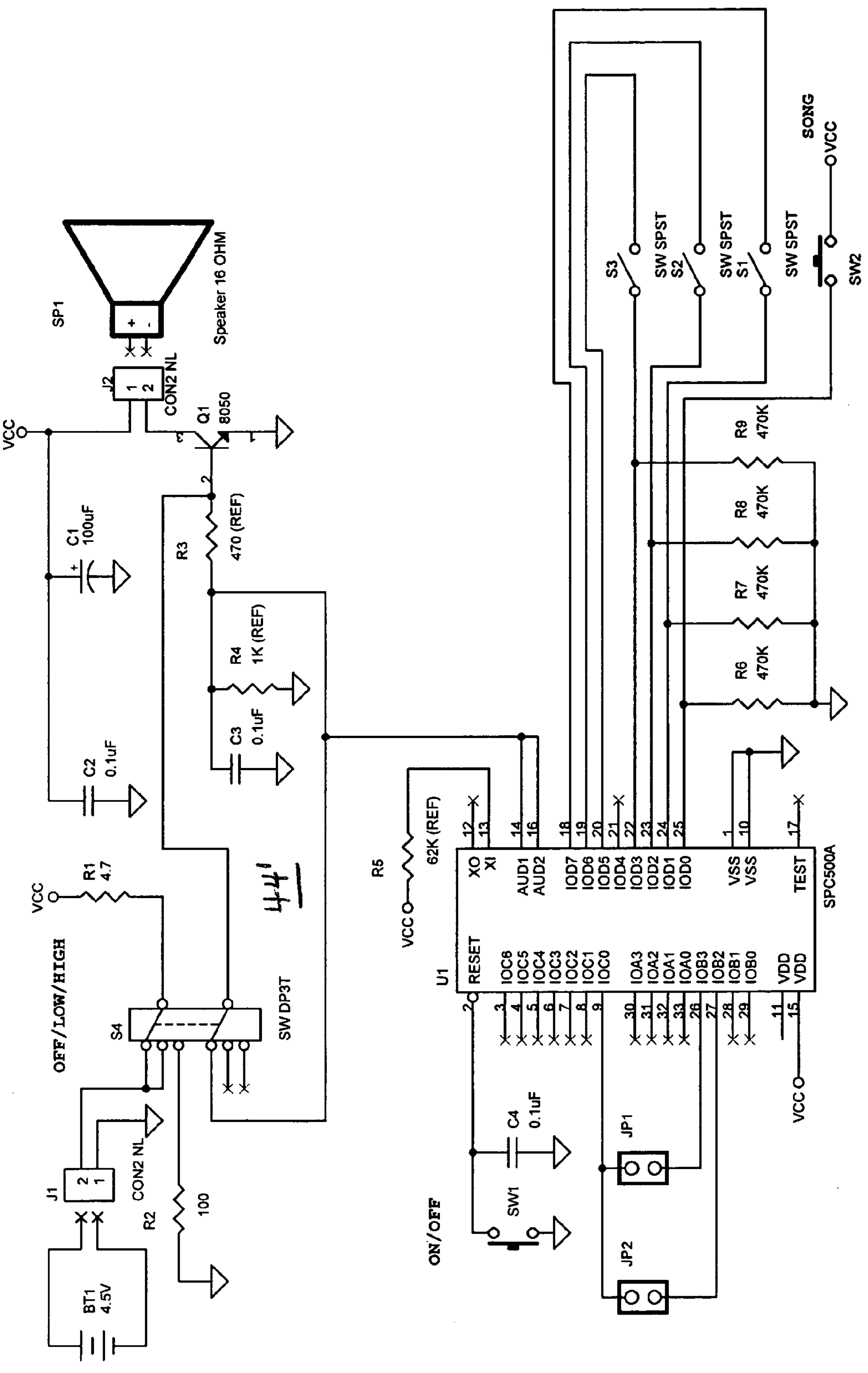
FIG. 7 shows an exemplary electrical schematic drawing for electronics that can be used in the embodiment of FIG. 6A.

FIG. 7 shows an exemplary circuit diagram of a circuit implementation that can be used in this embodiment. It is understood that many other circuit implementations can be used and yet still arrive at this embodiment. A microprocessor 44' is electrically coupled to the switch array, the on/off and song mode switches, and the speaker.

Figure 8:
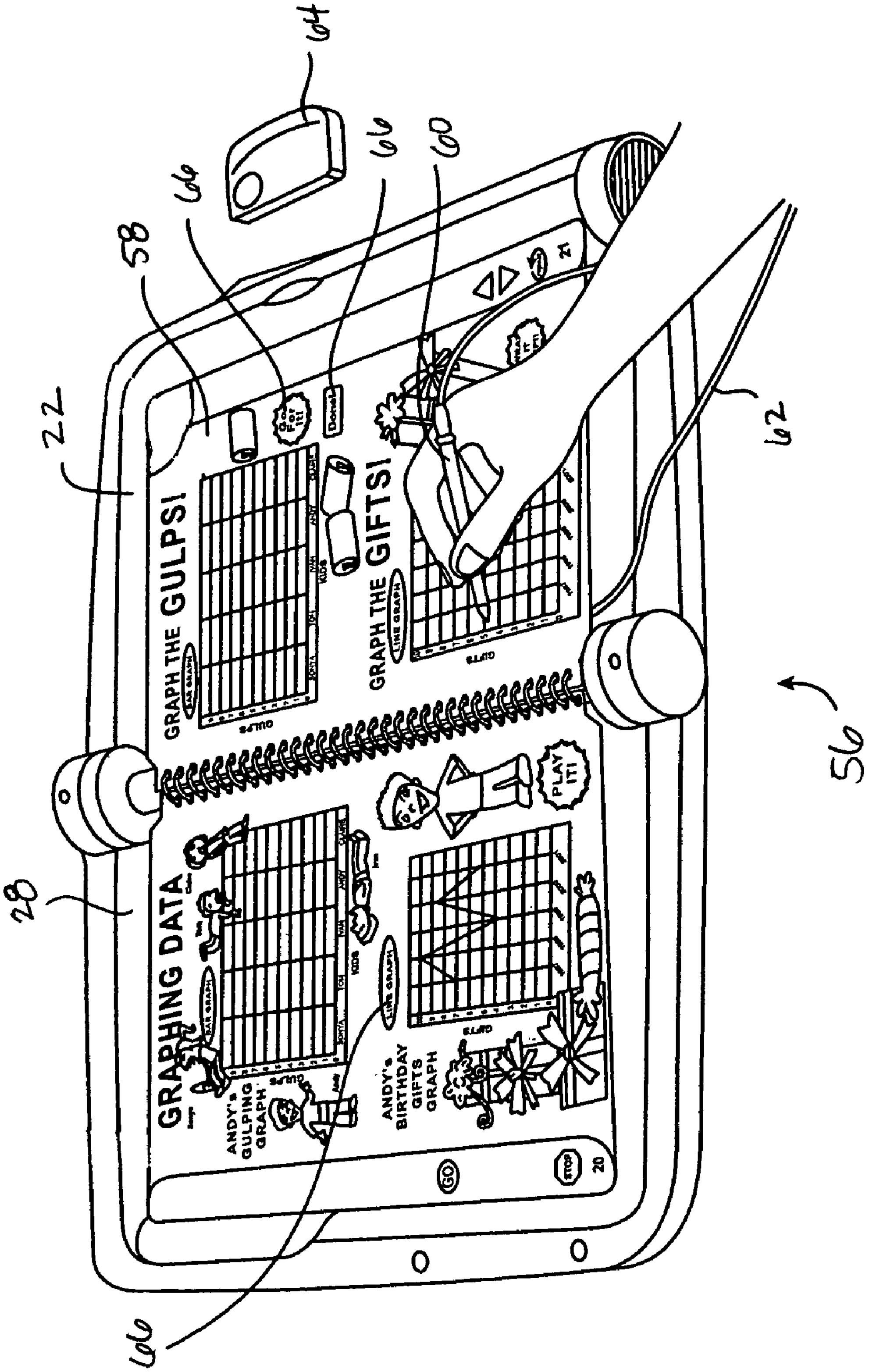
FIG. 8 shows a perspective view of the interactive print media apparatus including the magnetic switch according to another embodiment of the present invention.
Figure 9B:
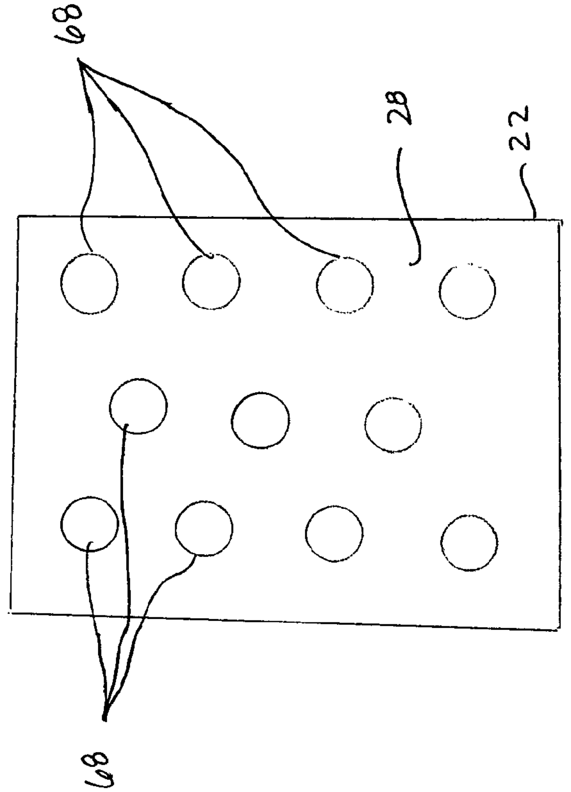
FIG. 9B shows a plan view of the magnetic switch locations in the embodiment of FIG. 8.
Figure 9A:
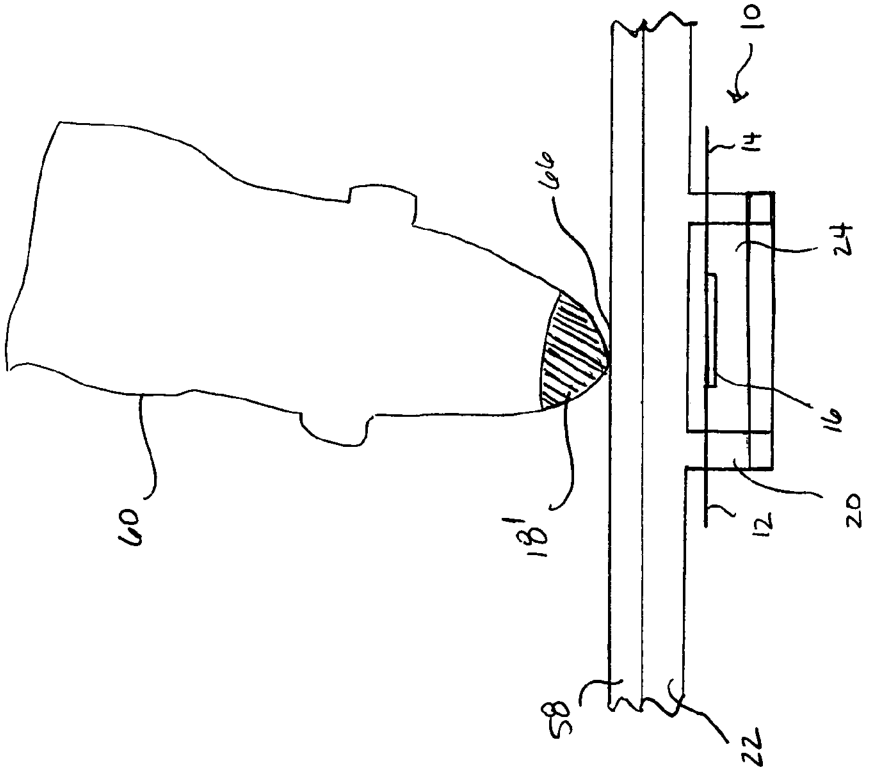
FIG. 9A shows a cross-sectional side view of the magnetic switch in a closed configuration in the embodiment of FIG. 8.

FIGS. 8, 9A, and 9B show an interactive print media apparatus 56 incorporating a magnetic position or location detection switch according to another embodiment of the invention. The interactive print media apparatus 56, which is described in more detail in co-pending U.S. patent application Ser. No. 10/360,564, generally includes a platform 22 that includes a surface 28, a magnetic switch 10 under the surface 28, a print medium 58 on the platform 22, a processor (not shown) coupled to the magnetic switch 10 and a speaker (not shown), and a stylus 60 coupled to the platform 22 via a wire 62. The stylus 60 includes a magnet 18' at a distal tip thereof which is adapted to close the magnetic switch 10, as shown in FIG. 9A. Additionally, a memory device 64 in the form of a data cartridge may plug into a recess (not shown) in the platform 22.

In a preferred embodiment, a magnetic position detection switch 10 comprises a first conductor 12, a second conductor 14 spaced apart from the first conductor 12, and a magnetic third conductor 16 disposed under the first 12 and second 14 conductors, as shown in FIG. 9A. Alternatively, the magnetic switch may comprise a reed switch. In either embodiment, the stylus 60 allows for interaction with print elements 66. Specifically, the magnet 18' in the stylus 60 is adapted to activate the magnetic switch 10 (e.g., closed and/or opened), thus informing the processor which in turn retrieves code for that specific print element 66 from a memory device and provides audio output through the speaker. Exemplary audio output associated with the print elements 66 may include letters, stories, numbers, words, phrases, jokes, music, rhymes, songs, rhythms, questions, answers, prompts, sound effects, fact, etc. Preferably, the audio output is provided after the user selects a print element 66 with the stylus 60. The print medium 58 may comprise a book, activity cards, or sheets that feature a variety of print elements 66. FIG. 9B illustrates the various switch locations 68 for a plurality of magnetic switches offset at different locations in the platform 22 under the surface 28.

Although FIGS. 8, 9A and 9B use arrays of magnetic switches in print media apparatuses, other types of apparatuses are also contemplated. For example, magnetic figurines could be disposed over a platform with an array of switches according to an embodiment of the invention. Placing a figurine at a particular position on the platform can activate a processor to provide an output related to the figurine and its position on the platform.

Figure 10A:
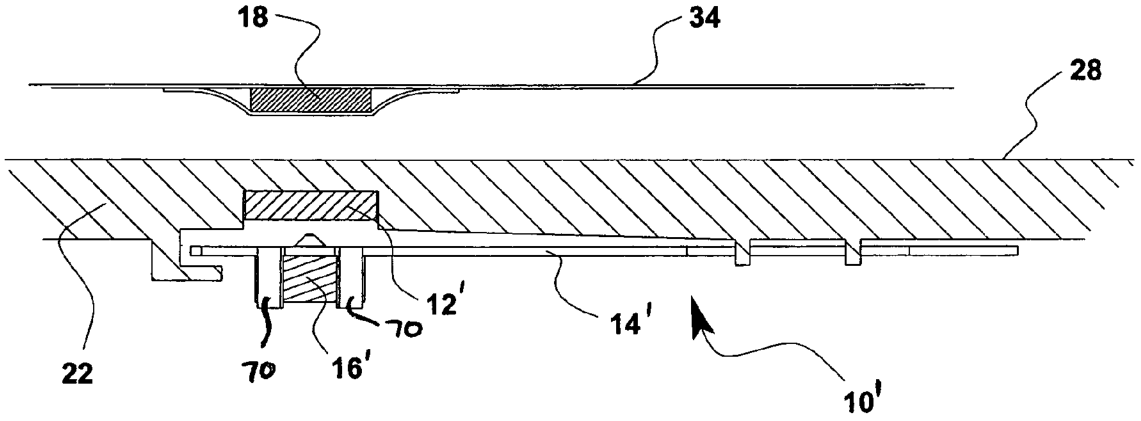
FIGS. 10A and 10B show cross-sectional side views of an exemplary magnetic switch in an open and closed configuration respectively according to another embodiment of the present invention.
Figure 10B:
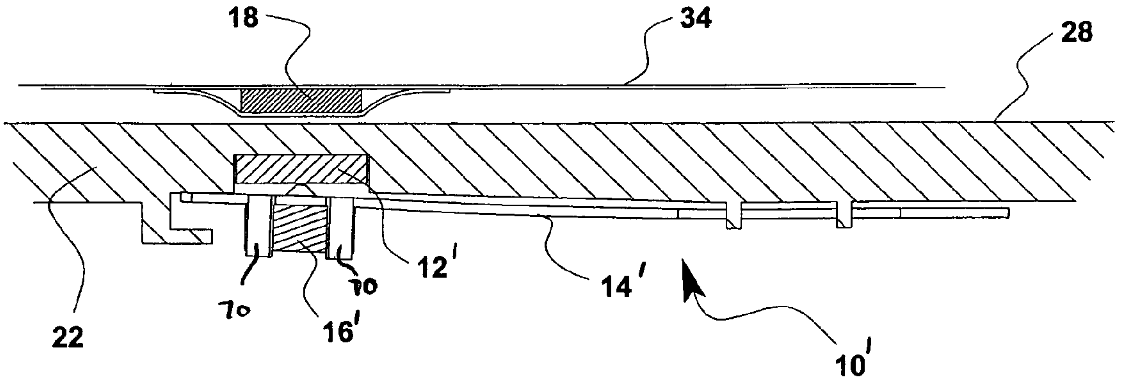

FIG. 10A shows a cross-sectional side view of an exemplary magnetic switch 10' in an open configuration and FIG. 10B shows a cross-sectional side view of the exemplary magnetic switch 10' in a closed configuration according to another embodiment of the invention. The magnetic switch 10' generally comprises a first conductor 12', a second conductor 14' spaced apart from the first conductor 12', and a first magnet 16' disposed under the first 12' and second 14' conductors. A second magnet 18 is further included, wherein the second magnet 18 is adapted to move the first magnet 16' so that the magnetic pressure causes the first 12' and second 14' conductors to contact each other, forming a conductive bridge which closes or shorts the switch 10', as shown in FIG. 10B. Such exemplary magnetic switches 10' of the present invention are also advantageously cost effective and reliable, and hence lend themselves for inclusion into children's apparatuses. It will further be appreciated that the exemplary magnetic switches 10' may be employed in any of the embodiments disclosed herein, including the apparatuses of FIGS. 2, 6A, and 8.

The first 12' and second 14' conductors may be formed from a variety of materials. Preferably, the first 12' and second 14' conductors are formed from non-magnetic conductive, materials, including copper, bronze, silver, gold, alloys thereof, and like materials. Alternatively, the first 12' and second 14' conductors may be formed from magnetic materials such as those described above. The first conductor 12' may be inserted or attached within the product platform 22 or base unit. The first magnet 16' is coupled to the second conductor 14' preferably with metal tabs 70 or like attachment mechanisms (e.g., adhesives or fasteners). Affixing the first magnet 16' to the second conductor 14' advantageously simplifies manufacturing processes and helps to maintain alignment of the first magnet 16' with the second magnet 18 along an axis. The first 16' and second 18 magnets may be formed from a variety of magnetic materials, including iron (ferrous materials), nickel, cobalt, alloys thereof, and like metals. When the second magnet 18 is in relatively close proximity of the first magnet 16', the magnetic field causes the first magnet 16' and the second conductor 14' to move towards the first conductor 12' until the first 12' and second 14' conductors form a conductive bridge. In this embodiment, the first magnet 16' is preferably non-conductive.

FIGS. 11A through 11D illustrate the print media apparatus including the exemplary magnetic switch 10' of FIGS. 10A and 10B according to another embodiment of the present invention. The print media apparatus 26 is substantially similar to the embodiment described above with respect to FIG. 2. The magnetic switch 10' generally comprises a first conductor 12', a second conductor 14' spaced apart from the first conductor 12', and a first magnet 16' disposed under the first 12' and second 14' conductors. A processor is coupled to the magnetic switch 10' and to the speaker. A second magnet 18 is coupled to a page 34 of the book 32 and adapted to move the first magnet 16' so that the magnetic pressure causes the first 12' and second 14' conductors to contact each other, forming a conductive bridge which closes or shorts the switch 10', as shown in FIG. 10B.

Figure 11A:
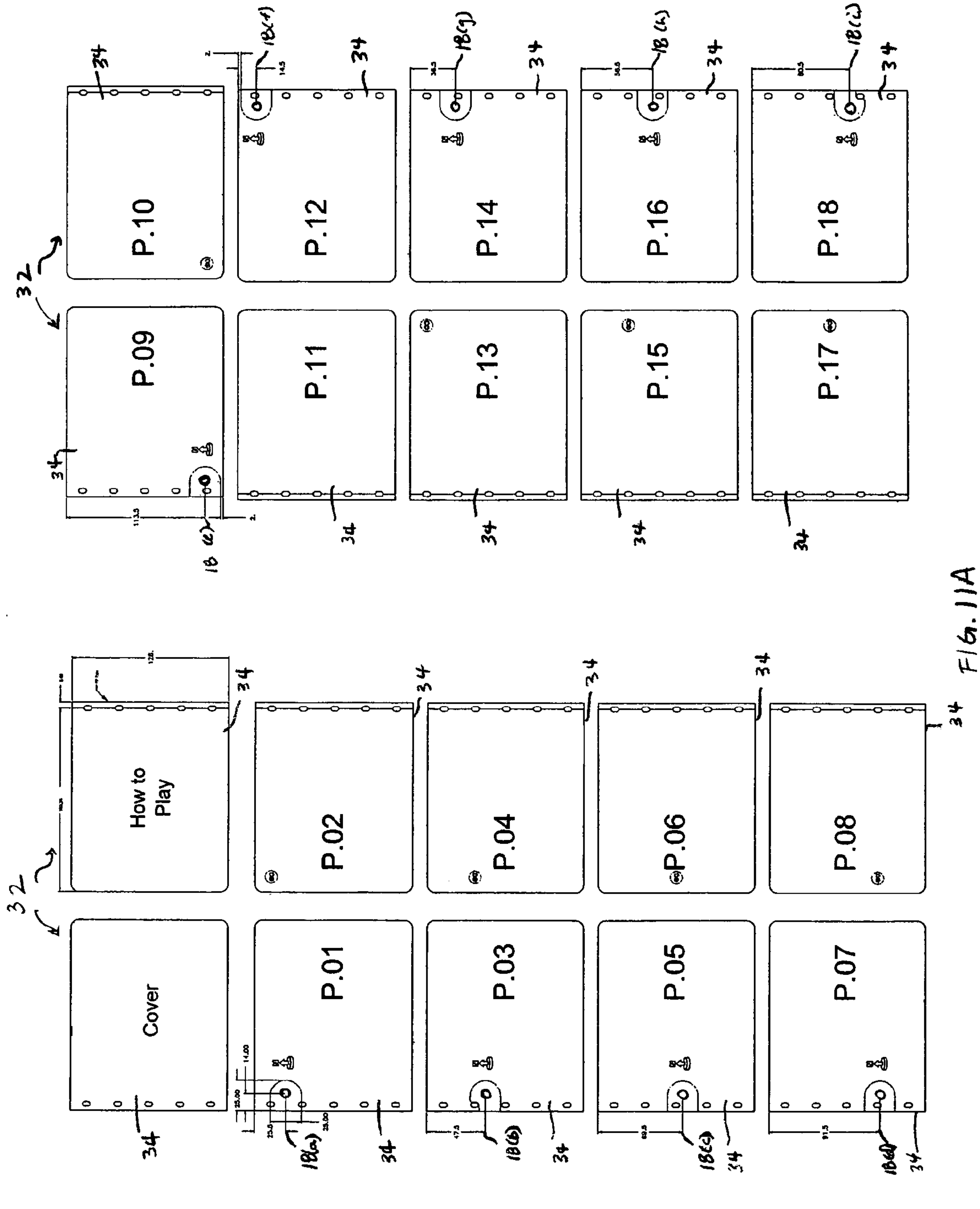
FIGS. 11A through 11D show plan, top, and bottom views of the print media apparatus including the exemplary magnetic switch according to another embodiment of the present invention.
Figure 11C:
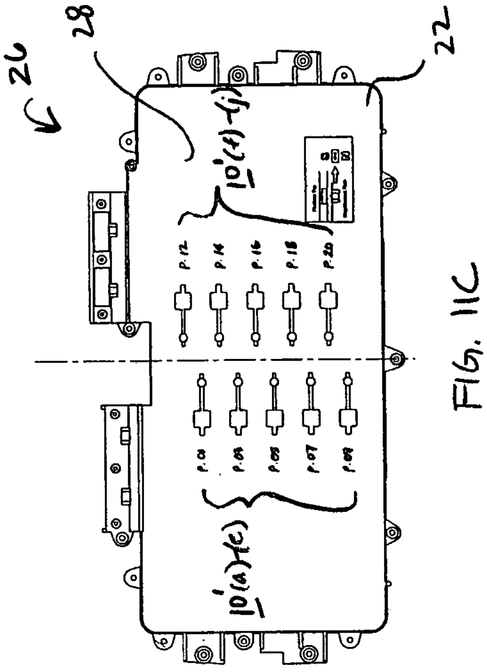
Figure 11D:
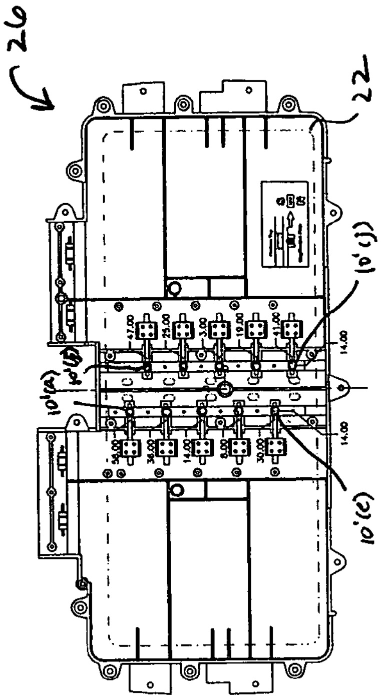
Figure 11B:
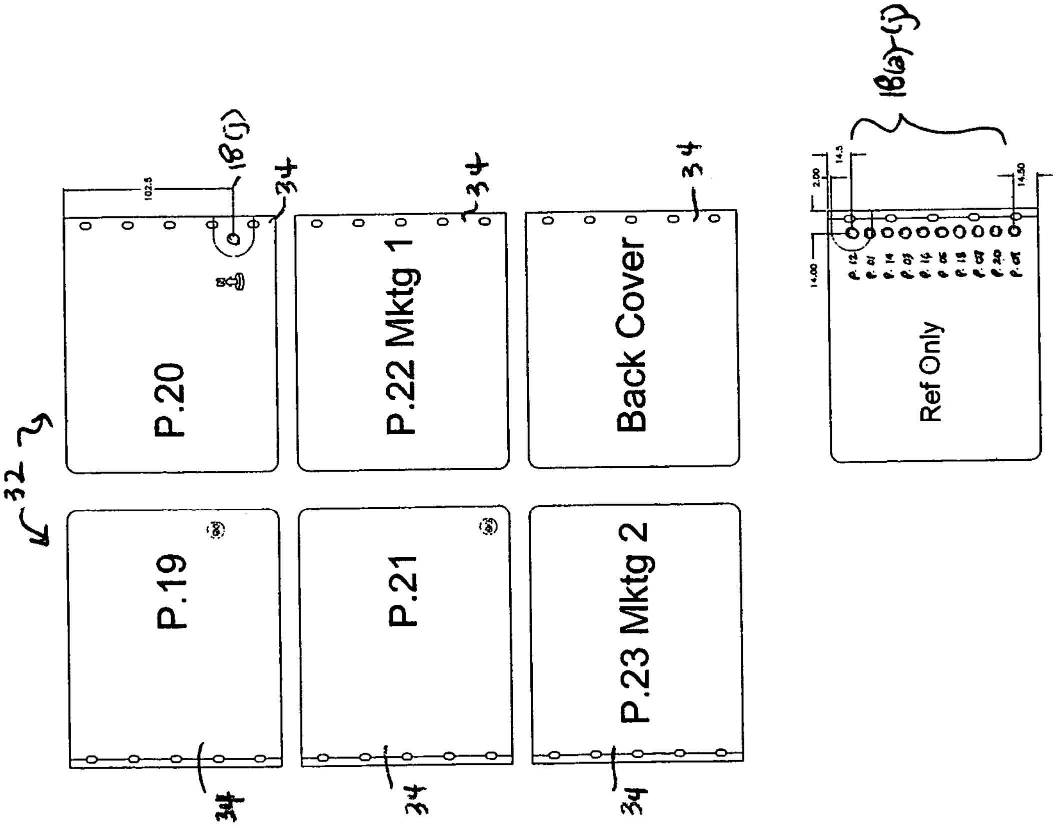

As shown in FIGS. 11A and 11B, the print media book 32 typically includes a plurality of magnets 18(*a*)–(*j*) offset at different locations within a plurality of pages 34 (e.g., P.01, P.03, P.05, P.07, P.09, P.12, P.14, P.16, P.18, P.20) so as to activate (e.g., open or close) a different switch 10' for each set of displayed pages. The magnets 18(*a*)–(*j*) in this embodiment may additionally be laminated or otherwise affixed, such as with adhesives, to the pages 34. Preferably, the magnets 18(*a*)–(*j*) are embedded within the pages 34 so they are hidden from the user. As shown in FIGS. 11C and 11D, the print media platform 22 includes a plurality of magnetic switches 10'(*a*)–(*j*) offset at different locations in the platform 22 under the surface 28. As illustrated, the magnets 18(*a*)–(*j*) and switches 10'(*a*)–(*j*) are preferably aligned and located at the edges of the pages 34 of the book 32 or along the spine of the book 32. This is done so that the page detection mechanism does not interface with the child's ability to interact with the content on the pages of the book.

Operation of the magnetic page detection switch 10' simply involves turning book pages 34 (i.e., pages themselves activate switches). Specifically, when a page 34 is turned, a specific switch or specific combination of switches 10' is activated (e.g., closed and/or opened), thus informing the processor in the product base 22 as to which page or pages 34 are currently being displayed to the user. The microprocessor in turn retrieves code for that specific page or pages 34 that are being displayed from a memory device and provides audio output through the speaker. For example, as shown in FIGS. 11A and 11C, magnet 18(*a*) is embedded in the left page (P.01) of the book, and it interacts with switch 10'(*a*) directly under it in the platform 22. The electronics in the platform 22 are informed that the pages shown in FIG. 11A are currently displayed. When the user turns the right page (P.03), this relocates the magnet 18(*b*) in the right page so that it is directly under the magnet 18(*a*). Magnet 18(*b*) then activates switch 10'(*b*) under it and informs the electronics in the platform that a new set of pages is being displayed to the user.

Figure 12A:
FIG. 12A through 12D show plan views of the plush book including the magnetic switch according to another embodiment of the present invention.
Figure 12B:
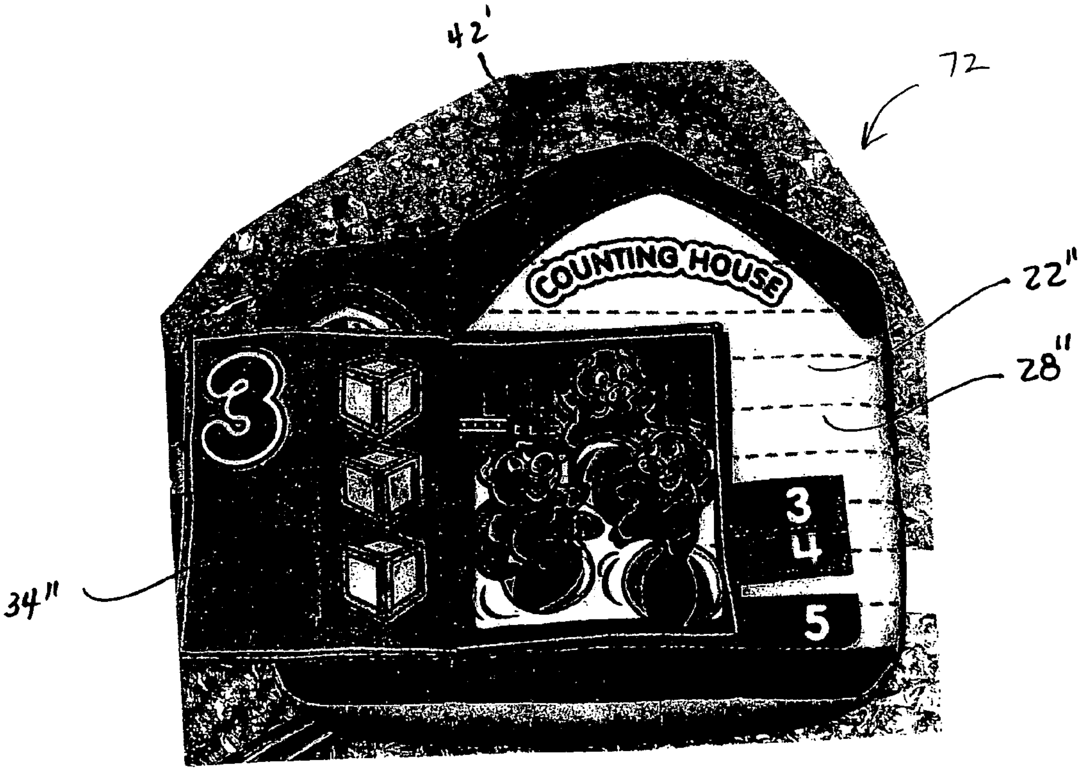
Figure 12C:
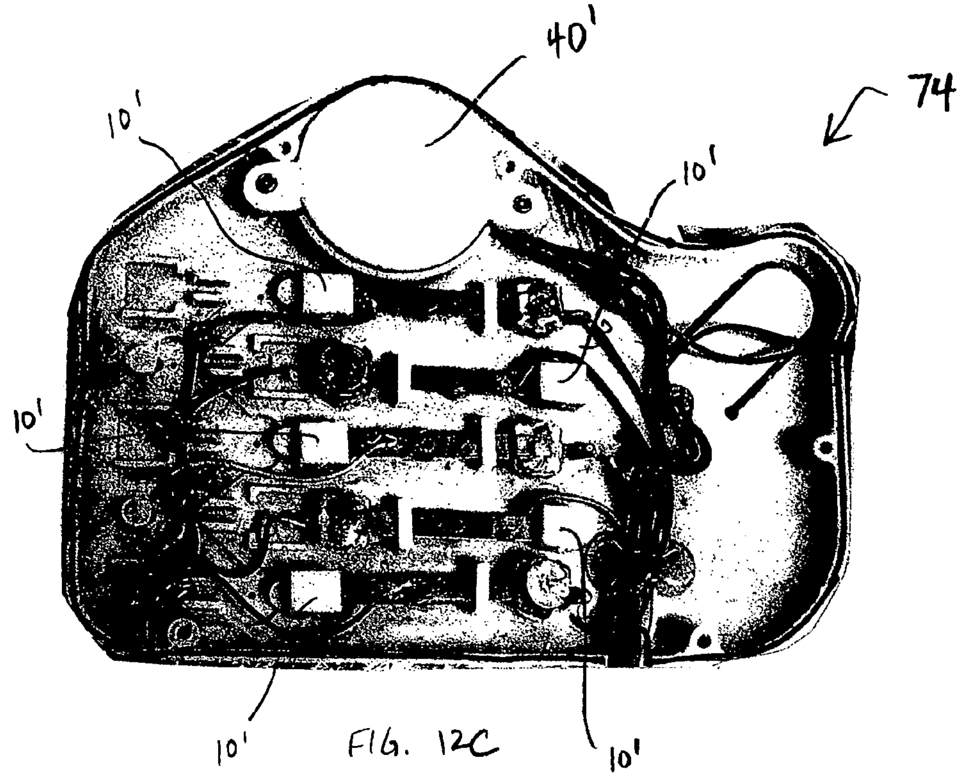
Figure 12D:
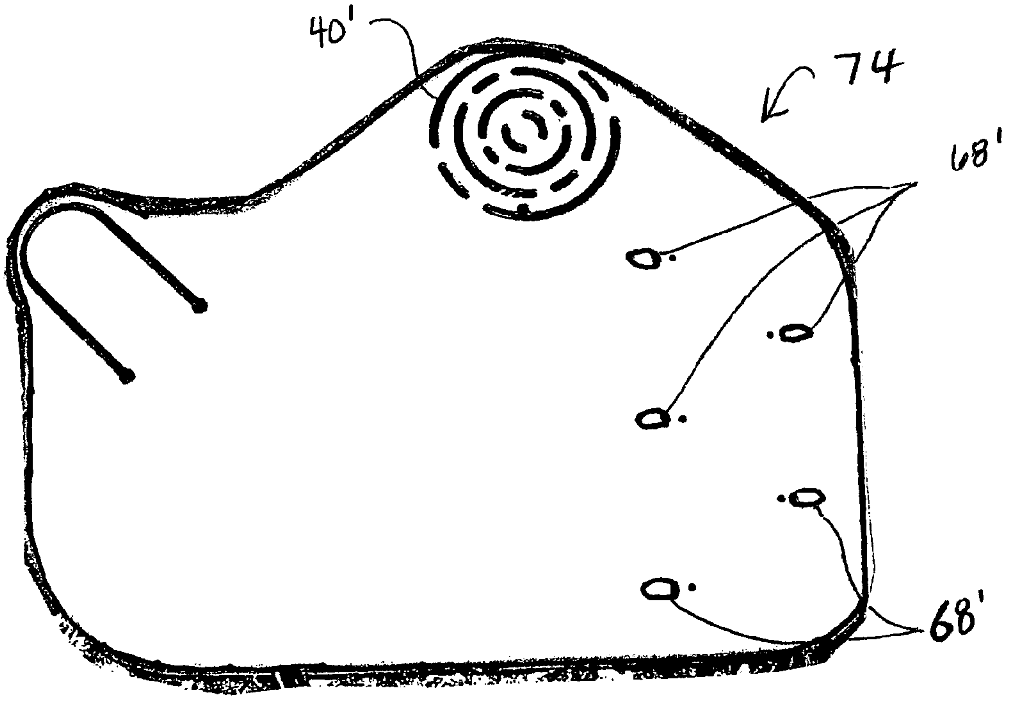

FIGS. 12A through 12D show a plush toy 72 incorporating magnetic page detection switches 10' that automatically detect turning of book pages, such as those illustrated in FIGS. 10A and 10B. The plush toy 72 includes a plush platform 22" having a surface 28", a switch 10' under the surface 28", a processor 44" coupled to the switch 10' and to a speaker 40' (FIGS. 12C and 13), and a plush book 32" on the surface 28". As further illustrated in FIGS. 12A and 12B, the plush book 32" has a plurality of pages 34". The plush toy 72 also includes a handle 42'. The plush body 22' may comprise a rigid or semi rigid housing structure 74 as shown in FIGS. 12C and 12D. The structure 74 houses the electronics (e.g., switch, processor, speaker, etc.) and is padded with a variety of batting materials, such as polyester fiber. A children's plush book 32" is shown that teaches about counting numbers. The book pages 34" may comprise soft fabric material that are additionally padded with a thin layer of batting materials, such as polyester fiber. Although older children can use this embodiment of the invention, it is especially suitable for use by younger children, preferably from 6 to 24 months of age.

Switches 10' are located under the surface 28" of the plush platform 22" at various switch locations 68' within the housing structure 74. The magnetic switch 10' generally comprises a first conductor 12', a second conductor 14' spaced apart from the first conductor 12', and a first magnet 16' disposed under the first 12' and second 14' conductors. A second magnet 18 is coupled to a page 34" of the book 32" and adapted to move the first magnet 16' so that the first 12' and second 14' conductors form a conductive bridge which closes the switch 10', as shown in FIG. 10B.

Figure 13:
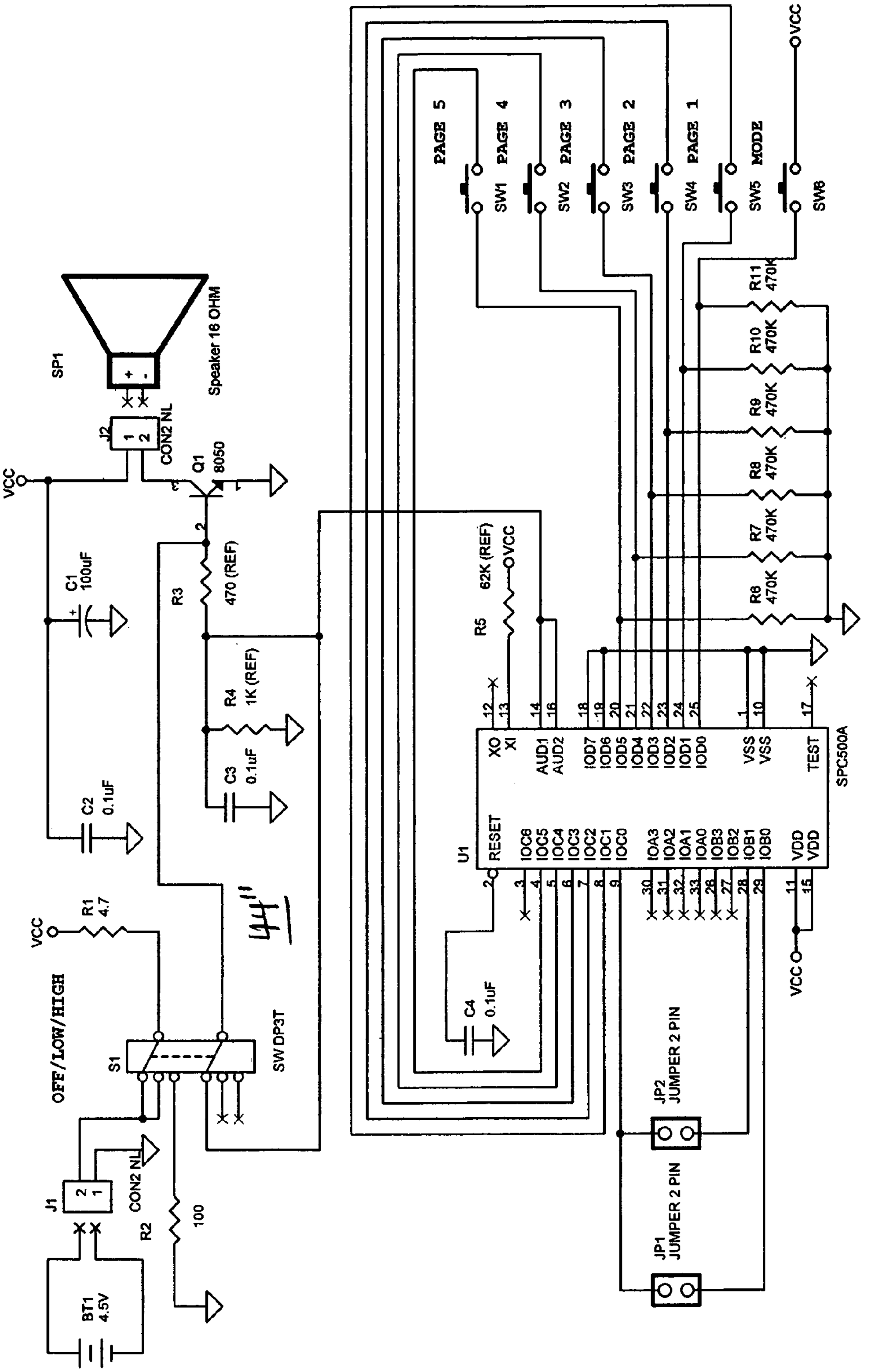
FIG. 13 shows an exemplary electrical schematic drawing for electronics that can be used in the embodiment of FIG. 12A.

FIG. 13 shows an exemplary circuit diagram of a circuit implementation that can be used in the embodiment of FIG. 12A. It is understood that many other circuit implementations can be used and yet still arrive at this embodiment. A microprocessor 44" is electrically coupled to the switch array and the speaker.

It is understood that any of the above described functions may be programmed into a memory device in or coupled to the above described apparatuses by one of ordinary skill in the art, and that embodiments of the invention include apparatuses with memory devices that are preprogrammed to provide such functions. The memory device may further be removable and preferably comprise a data cartridge, but may also be a CD-ROM, memory stick, or other removable memory device. It is also possible to download new computer code to the apparatuses or to a memory device, and then use the new downloaded code. The downloaded code can be from a server computer that is accessible through the Internet. Various downloading methods are described in, for example, U.S. Pat. No. 6,608,618.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All references, patent applications, and patents mentioned above are herein incorporated by reference in their entirety for all purposes. None of them are admitted to be prior art to the presently claimed inventions.

What is claimed is:

1. A magnetic switch comprising:

(a) a first conductor;

(b) a second conductor spaced apart from the first conductor;

(c) a first magnet disposed under the first and second conductors; and (d) a second movable magnet adapted to move the first magnet so that the first and second conductors form a conductive bridge.

2. The magnetic switch of claim 1, wherein the first and second conductors are formed from non-magnetic material.

3. The magnetic switch of claim 2, wherein the first and second conductors are formed from copper, bronze, silver, or gold material.

4. The magnetic switch of claim 1, wherein the first or second magnet is formed from ferrous, iron, nickel, or cobalt material.

5. The magnetic switch of claim 1, wherein the first magnet is non-conductive.

6. The magnetic switch of claim 1, wherein the first magnet is coupled to the second conductor and the second magnet is adapted to move the first magnet and the second conductor towards the first conductor.

7. The magnetic switch of claim 1, wherein the first and second magnets are aligned along an axis.

8. The magnetic switch of claim 1, wherein the second magnet is laminated.

9. A print media apparatus comprising:

(a) a platform including a surface;

(b) at least one magnetic switch under the surface, the at least one magnetic switch including first and second spaced apart conductors and a first magnet disposed under the first and second conductors;

(c) a processor coupled to the at least one magnetic switch; and (d) a book on the surface, wherein a second movable magnet is coupled to a page of the book and adapted to move the first magnet so that the first and second conductors form a conductive bridge.

10. The print media apparatus of claim 9, wherein the at least one magnetic switch comprises a plurality of magnetic switches offset at different locations in the platform under the surface.

11. The print media apparatus of claim 9, wherein the second magnet comprises a plurality of magnets offset at different locations on a plurality of pages.

12. The print media apparatus of claim 9, further comprising:

(e) a speaker coupled to the processor.

13. The print media apparatus of claim 9, wherein the book is a children's book.

14. The print media apparatus of claim 9, wherein the first and second conductors are formed from non-magnetic material.

15. The print media apparatus of claim 9, wherein the first and second conductors are formed from copper, bronze, silver, or gold material.

16. The print media apparatus of claim 9, wherein the first or second magnet is formed from ferrous, iron, nickel, or cobalt material.

17. The print media apparatus of claim 9, wherein the first magnet is non-conductive.

18. The print media apparatus of claim 9, wherein the first magnet is coupled to the second conductor and the second magnet is adapted to move the first magnet and the second conductor towards the first conductor.

19. The print media apparatus of claim 9, wherein the first and second magnets are aligned along an axis.

20. A print media apparatus of claim 9 wherein the first and second conductors form a conductive bridge when the second magnet moves downward towards the first magnet.

21. A print media apparatus of claim 9 wherein the first magnet is coupled to the second conductor and the second magnet moves the first magnet and the second conductor towards the first conductor when the second magnet moves downward towards the first magnet.

22. A print media apparatus of claim 9 wherein the second magnet is disposed directly above the first ad second conductors and the first magnet is disposed directly under the first and second conductors.

23. A print media apparatus of claim 9 wherein the second magnet is and the first conductor are aligned along a axis.

24. A print media apparatus of claim 9 wherein a end of the first magnet is attracted to an adjacent end of the second magnet.

25. A print media apparatus of claim 9 wherein the first magnet lies completely below the first and second conductors.

26. A print media apparatus comprising:

(a) a platform including a surface;

(b) at least one magnetic switch under the surface, the at least one magnetic switch including first and second so spaced apart conductors and a first magnet disposed under the first and second conductors;

(c) a processor coupled to the at least one magnetic switch; and (d) a book on the surface, wherein a second movable magnet is coupled to a page of the book and adapted to move the first magnet so that the first and second conductors form a conductive bridge, wherein the second magnet is embedded within the page.

27. A print media apparatus comprising:

(a) a platform including a surface;

(b) at least one magnetic switch under the surface, the at least one magnetic switch including first and second spaced apart conductors and a first magnet disposed under the first and second conductors;

(c) a processor coupled to the at least one magnetic switch; and (d) a children's book on the surface, wherein a second magnet is embedded within a page of the book and adapted to move the first magnet so that the first and second conductors form a conductive bridge.

* * * * *